April 14, 1936. A. WAGNER 2,037,553
PORTABLE LEMON SLICE SQUEEZER FOR TABLE USE
Filed April 2, 1934
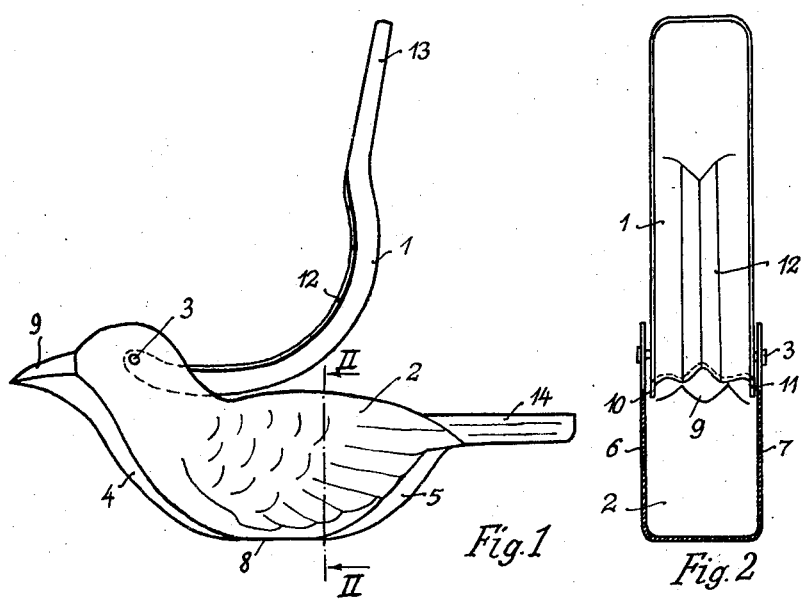
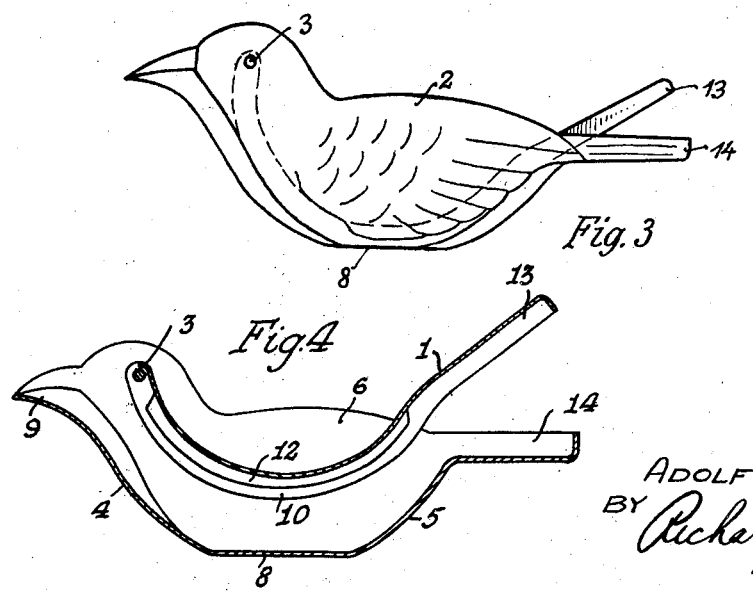
INVENTOR
ADOLF WAGNER
BY Richards & Geier
ATTORNEYS Patented Apr. 14, 1936

2,037,553

UNITED STATES PATENT OFFICE 2,037,553

PORTABLE LEMON SLICE SQUEEZER FOR TABLE USE

Adolf Wagner, Mussbach, Germany, assignor to Süddeutsche Metallwaren-Fabrik Kommandit-Gesellschaft, Mussbach (Rheinpfalz), Germany Application April 2, 1934, Serial No. 718,549
In Germany December 30, 1933

1 Claim. (Cl. 100—41)

The present invention relates to a lemon slice squeezer for table use and has for its object to provide a device of small dimensions which can be used on the table without a saucer.

Squeezing devices particularly for extracting the juice of one-half of a lemon cut crosswise, or circular lemon slices are already known which consist of two articulated levers with a container for the juice. The present invention provides a device of this type for squeezing slices cut from the fruit in a longitudinal direction; it also provides a container for the juice, which, in spite of the small dimensions of the device, possesses a great capacity for juice. In addition the present invention embodies a distinctive and pleasing design which is a very important feature in its application to table use, while at the same time it provides a very simple and inexpensive construction.

The squeezer according to the present invention comprises a body portion terminating at one end in a handle and a lever articulately connected to the body portion and which also terminates in a handle. The body portion serves the double purpose of a rest for the fruit to be squeezed and a collector for the juice. To accomplish this purpose the body is given an oblong shape and centrally recessed to conform to the contour of the fruit to be squeezed. For the additional purpose of permitting the juice to be poured, the end opposite to the handle of this body portion is terminated in a spout.

The lever is bent from a small strip of material in such a manner that its pressing surface corresponds to the curved form of the bottom surface of the container and so that only the handle projects from the container when it is pressed together against the body portion, and is made so that it blends with the design in which the invention is embodied.

The drawing shows as an embodiment of the invention a lemon slice squeezer of the type described in the form of a bird, in which Figure 1 is a side elevation of the squeezer before the lever is pressed against the body portion, Figure 2 is a section along the line II—II of Figure 1, and Figure 3 is a side elevation with the levers pressed against the body portion.

Figure 4 is a central longitudinal section through the device.

The squeezer consists of a lever 1 and a body portion 2 articulated together at 3. Both the lever and the body portion are bent to more or less semi-circular shape. The lever 2 forms with its raised base parts 4 and 5 and its two comparatively high side walls 6 and 7 a container. To obtain a good firm stand, the base is flattened out so as to form a resting surface 8. The beak 9 of the body portion 2 forms a spout.

The lever 1 is bent downwards on its longitudinal side edges at 10 and 11 to a U-shape, in order to prevent the peel being squeezed out when the lever is pressed against the body portion. It is also provided in the middle with a groove 12 having a raised outside edge, in which groove the slide of lemon is guided when the lever is pressed towards the body portion. When the squeezer is being used, the lever 1 and body portion 2 are pressed against each other with their extremities 13 and 14. The juice thereupon collects in the container 2 and can then be poured out, without further squeezing, in small quantities.

In the embodiment illustrated in the drawing the two side walls 6 and 7 of the container 2 are cut and stamped on the outside to the outline of a bird, so that the utensil looks like a swimming sea-gull. In the known manner the parts may be made of acid-proof metal or may be provided with acid-proof coatings.

The lemon slice squeezer made in accordance with the present invention can, therefore, be used for the sprinkling of food stuffs as well as being a simple means of preparing fruit juice on the table. Consequently, the fruit to be inserted may not only comprise lemon slices but also orange slices and the like.

I claim:—

Lemon slice squeezer for table use comprising a body portion and lever articulately connected to said body portion adjacent one extremity thereof, said body portion being oblong in shape and recessed from the extremities towards the center to conform to the contours of the fruit slice and to serve as a juice collecting container, said body portion terminating at its articulated end in a spout and at its opposite extremity in a handle, said lever being curved intermediate its point of articulation and its free extremity to conform to the bottom surface of said recessed body portion, said free extremity terminating in a handle projecting beyond the recessed portion of said body portion when in a closed position, and said lever being bent along its longitudinal side edges to form with the intermediate wall a grooved formation of about the thickness of a lemon peel, whereby a longitudinal groove is provided, which is adapted to center the lemon slice during squeezing.

ADOLF WAGNER.